United States Patent
Yu et al.

(10) Patent No.: US 7,840,891 B1
(45) Date of Patent: Nov. 23, 2010

(54) METHOD AND SYSTEM FOR CONTENT EXTRACTION FROM FORMS

(75) Inventors: Jay Jie-Bing Yu, San Diego, CA (US); Evan Worley, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1064 days.

(21) Appl. No.: 11/586,937

(22) Filed: Oct. 25, 2006

(51) Int. Cl.
*G06F 17/30* (2006.01)

(52) U.S. Cl. ....................................... 715/223
(58) Field of Classification Search .................. 715/223
See application file for complete search history.

(56) References Cited

U.S. PATENT DOCUMENTS

2007/0033118 A1* 2/2007 Hopkinson ................... 705/31
2007/0078886 A1* 4/2007 Rivette et al. ............... 707/102

* cited by examiner

*Primary Examiner*—Doug Hutton
*Assistant Examiner*—Tionna Smith
(74) *Attorney, Agent, or Firm*—Osha • Liang LLP (57) ABSTRACT

A method for presenting content in a form including extracting, from an open format for rendering the form, a plurality of elements on the form, wherein the plurality of elements represent the content in the form, identifying a plurality of contextual relationships between the plurality of elements, wherein identifying the plurality of contextual relationships that includes identifying a first attribute of a first element of the plurality of elements, identifying a second attribute of a second element of the plurality of elements, and relating the first element with the second element when a difference between the first attribute and the second attribute is within a predefined threshold, generating a representation of the form, wherein the representation that includes information about the plurality of contextual relationships, and presenting the content in the form based on the representation.

49 Claims, 5 Drawing Sheets

| | | |
|---|---|---|
| Payments 248→ | 64 Federal income tax withheld from Forms W-2 and 1099 | 64 |
| | 65 2005 estimated tax payments and amount applied from 2004 return | 65 |
| 260a → If you have a | 66a Earned income credit (EIC) | 66a |
| 260b → qualifying | b Nontaxable combat pay election  66b | |
| 260c → child, attach | 67 Excess social security and tier 1 RRTA tax withheld (see page 59) | 67 |
| 260d → Schedule EIC. | 68 Additional child tax credit. Attach Form 8812 | 68 |
| | 69 Amount paid with request for extension to file (see page 59) | 69 |
| 250→ 70 | Payments from: a ☐ Form 2439  b ☐ Form 4136  c ☐ Form 8885 | 70 |
| | 252⤴ | |
| | 71 Add lines 64, 65, 66a, and 67 through 70. These are your total payments ▶ | 71 |

270 ⟵ (brace around item descriptions)  
264 ⟵ (brace around value column)  
266 ⟵ (brace at right)

METHOD AND SYSTEM FOR CONTENT EXTRACTION FROM FORMS

BACKGROUND

Every year millions of individuals, companies, and other institutions submit filled forms to organizations (e.g., companies, governments, non-profit organizations, etc.). For example, forms may be directed towards taxes, inventory, accounting, medical, administrative information, etc.

A form includes static text and editable fields for a user to enter (i.e., input) information. The static text describes the type of information the user is to enter into the editable fields and/or instructions for the user to enter data into the editable fields. For example, static text may correspond to a request for an individual's name. The editable fields near the request for the individual's name corresponds to a position in which the individual writes or types her name.

Over time, new versions of a form are created. Specifically, the form changes. For example, the organization that creates the form may have different requirements, may want to add clarity to the static text, or may change the visual display of the form. In such scenarios, the organization often uses the old form as a basis to generate the new form. Specifically, the organization may add new lines, modify the static text, and/or change the editable fields (e.g., amount of space, type of space, etc.).

When changes to a form occur, software products that assist users to input information into the editable fields and users of the form need to be apprised of the changes. An individual associated with the user or the software product may review the form and note the changes on the form. Thus, the software product is manually changed to represent the changes in the form and the user is apprised of the changes.

SUMMARY

In general, in one aspect, the invention relates to a method for presenting content in a form including extracting, from an open format for rendering the form, a plurality of elements on the form, wherein the plurality of elements represent the content in the form, identifying a plurality of contextual relationships between the plurality of elements, wherein identifying the plurality of contextual relationships that includes identifying a first attribute of a first element of the plurality of elements, identifying a second attribute of a second element of the plurality of elements, and relating the first element with the second element when a difference between the first attribute and the second attribute is within a predefined threshold, generating a representation of the form, wherein the representation that includes information about the plurality of contextual relationships, and presenting the content in the form based on the representation.

In general, in one aspect, the invention relates to a system for presenting content in a form including an element extractor configured to extract, from an open format for rendering the form, a plurality of elements on the form, wherein the plurality of elements represent the content in the form. The system also includes a content engine connected to the element extractor and configured to access the plurality of elements, and identify a plurality of contextual relationships between the plurality of elements, wherein identifying the plurality of contextual relationships that includes identifying a first attribute of a first element of the plurality of elements, identifying a second attribute of a second element of the plurality of elements, and relating the first element with the second element when a difference between the first attribute and the second attribute is within a predefined threshold. The content engine is further configured to generate a representation of the form, wherein the representation that includes information about the plurality of contextual relationships. The system further includes a presentation tool operatively connected to the content engine and configured to access the representation, and present the content using the representation.

In general, in one aspect, the invention relates to a computer program product for presenting content in a form including computer readable program code including instructions for extracting, from an open format for rendering the form, a plurality of elements on the form, wherein the plurality of elements represent the content in the form, identifying a plurality of contextual relationships between the plurality of elements, wherein identifying the plurality of contextual relationships that includes identifying a first attribute of a first element of the plurality of elements, identifying a second attribute of a second element of the plurality of elements, and relating the first element with the second element when a difference between the first attribute and the second attribute is within a predefined threshold, generating a representation of the form, wherein the representation that includes information about the plurality of contextual relationships, and presenting the content in the form based on the representation.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for extracting content from forms. Specifically, a form includes content. The content in the form is the editable fields, such as check boxes, fields, radio buttons, etc. in which a user may input data and the text that describes the editable fields. Moreover, embodiments of the invention connect the content in a form and derive identifiers for the connected content. Specifically, embodiments of the invention identify the text and editable field that is contextually related to the text and relate them. Using the connected context, presentation tools that assist the user in inputting data into the form may be developed, differences between generations of the form may be accounted for, and the form may be automatically reformatted so as to be more user-friendly.

Figure 1:
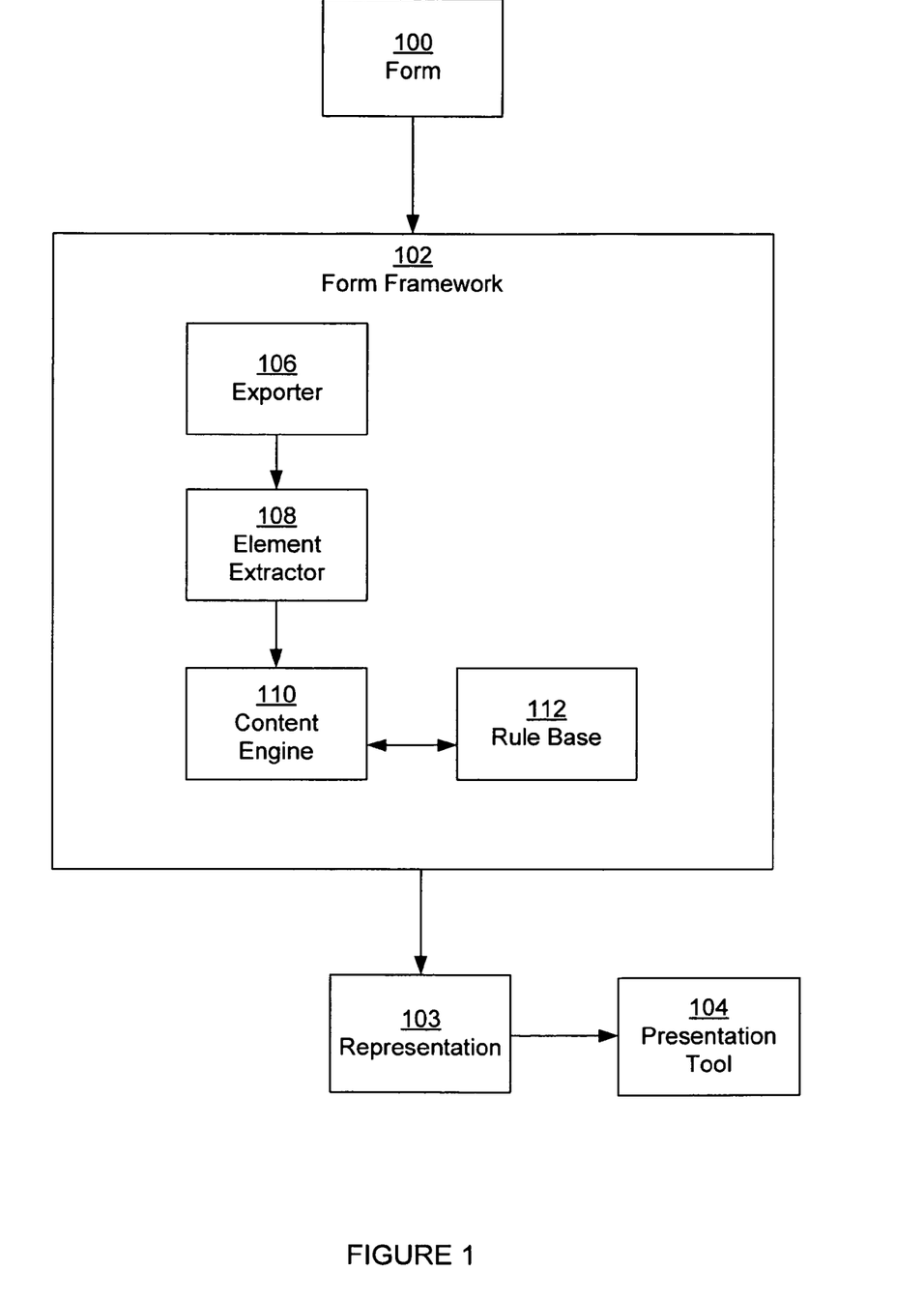
FIG. 1 shows a schematic diagram of a system for content extraction from forms in accordance with one or more embodiments of the invention.

FIG. 1 shows a schematic diagram of a system for content extraction from forms in accordance with one or more embodiments of the invention. As shown in FIG. 1, the system includes a form (100), a form framework (102), and a presentation tool (104). Each of these components is described below.

The form (100) corresponds to any object with static and/or editable content for a user to input information in accordance with one or more embodiments of the invention. A form (100) may include text, user selection boxes (e.g., checkboxes, radio buttons, drop-down menus, etc.), editable fields (i.e., user-enterable space for the user or computer to input user-generated or calculated information), indicator images (e.g., lines, pictures, and other such images), etc. The text may correspond to descriptive text (e.g., instructions, identifiers, name, etc.), for a field, selection box, the form, a portion of the form, descriptive text, etc.

The form (100) may be displayed on physical paper, a computer device, etc. If the form is displayed on a computer device, then the form may have a file type corresponding to an image file (e.g., bit map, jpeg, etc.), html form, portable document format (PDF), or any other form generation document format.

The form (100) is coupled to a form framework (102) in accordance with one or more embodiments of the invention. A form framework (102) includes functionality to extract and relate content in a form (100). A form framework includes an exporter (106), an element extractor (108), a content engine (110), and a rule base (112) in accordance with one or more embodiments of the invention. Each of these components is described below.

An exporter (106) includes functionality to transform native format (i.e., the file type) of the form (100) to an open format of the form (100). Specifically, the open format describes how to render the form(100) by identifying specific atomic elements of the form and the information necessary only to render the form, such as the exact physical location of the elements on the form (e.g., as referenced by a single point or line on the form, etc.). In one or more embodiments of the invention, the open format complies with Extensible Markup Language (XML). Further, in one or more embodiments of the invention, the exporter is an Adobe® Designer (developed by Adobe Systems, Inc. located in San Jose, Calif.; Adobe is a registered trademark of Adobe Systems, Inc.) application that includes functionality to create an XML Data Package (XDP) code from a form in PDF.

An element of the form (100) corresponds to a single item in the form. For example, the element may correspond to a line of text, a single field, a single selection box, etc. The start and end of an element may be denoted by breaks (e.g., line breaks, page breaks, etc.), indicators, such as vertical lines, elements of a different type, empty space, etc. Thus, for example, an instruction that is rendered in three lines on the left hand side of the form may be represented in the open format of the form as three different unrelated elements (i.e., each element is a line of the instruction). In another example, a field for entering social security number may be represented by three different distinct elements.

Each element may have one or more attributes in accordance with one or more embodiments of the invention. Further, multiple elements may have the same attribute. An attribute corresponds to information about the element in accordance with one or more embodiments of the invention. The attributes may correspond to the value of the element (e.g., the displayed text (i.e., text that is viewable on the form), a default value, etc.), the location of the element on the page, the font type of the element, the size of the element, the number of characters reserved for the element, the type of element (e.g., text, selection box, field, or other type), etc.

Continuing with FIG. 1, an element extractor (108) is coupled to the exporter (106) in accordance with one or more embodiments of the invention. An element extractor (108) includes functionality to access the open format of the form (100) generated by the exporter (106), identify the elements in the form from the open format, and extract the elements from the open format. In one or more embodiments of the invention, the elements are extracted as objects that comply with an object-oriented language, such as C++ or JAVA™ (developed by and a trademark of Sun Microsystems, Inc. located in Santa Clara, Calif.). In one or more embodiments of the invention, each object has variables corresponding to the attributes of the element.

The element extractor (106) is coupled to a content engine (110) in accordance with one or more embodiments of the invention. A content engine (110) includes functionality to access the extracted elements, identify the contextual relationships between the extracted elements, and relate the extracted elements to create a representation (103) of the form. The representation (103) shows the relationships between the content of the form.

Elements are contextually related if the content of the elements are related on the form in accordance with one or more embodiments of the invention. For example, an editable field and text describing the editable field are contextually related. In contrast, an editable field on a first page of the form may not be contextually related to text on a third page of the form if nothing exists in the text that references the editable field. For example, if the text does not include an identifier of the editable field on the third page of the form.

Relating the extracted elements may include creating a reference (e.g., pointer, identifier reference, etc.) from one element to another, transforming an element into a variable of another element, or performing any other technique that may be used to relate elements.

In one or more embodiments of the invention, the representation (103) of the form (100) corresponds to the interrelated elements stored in memory with information about the contextual relationships. For example, the representation may correspond to a description of the elements and the contextual relationships that complies with Extensible Markup Language (XML), an object-oriented language, and is stored in a file, database, Random Access Memory, Read Only Memory, etc. In another example, the representation may correspond to an output of the elements and the contextual relationships between the elements (e.g., sent for processing to another application, to an output device, etc.). For example, if the representation corresponds to an XML document, then the elements and the contextual relationships may be represented as a conglomerated element. Each conglomerated element includes the XML definitions of the elements that are contextually related.

To identify the contextual relationships between the extracted elements, the content engine (110) includes functionality to access a rule base (112) in accordance with one or more embodiments of the invention. A rule base (112) corresponds to a collection of rules. The rule base (112) may be stored as part of the content engine (110) or in a separate storage unit, such as in a file, a database, or any other type of storage area.

Rules in the rule base (112) specify types of elements that are related in accordance with one or more embodiments of the invention. The rules may be inclusion rules and/or exclusion rules. An inclusion rule specifies when elements are related. For example, an inclusion rule may specify a regular expression that defines a fully qualified identifier. Specifically, determining whether identifiers are qualified or not qualified may be performed using a regular expression rule. Identifiers that are not fully qualified are qualified using identifier inference. For example, an element that corresponds to a "b", then nearby elements may be searched to find elements that are numerical, such as nearby "9" to fully qualify the element. In the example, if "9a" precedes the "b" on the form and because a alphabetically is directly before "b," then inferring the identifier for the element corresponding to "b" may be performed by extracting the numeric portion of "9a" (i.e., "9") and appending the numeric portion onto "b" to create "9b."

In contrast to inclusion rules, an exclusion rule specifies when elements are not related. For example, an exclusion rule may specify those elements that are separated by a long horizontal line or a page break are not related. If two elements are not categorized under any of the exclusion rules, then the elements may be deemed as related in accordance with one or more embodiments of the invention.

Certain rules may be considered both inclusion and exclusion rules depending on how the rule is specified. For example, an inclusion rule may state that if the difference between the location of two elements (i.e., vertical distance, horizontal distance, or diagonal distance) is within a pre-defined threshold, then the elements may be identified as related. Conversely, the corresponding exclusion rule may state that if the difference between the two elements is not within a pre-defined threshold, then the elements may be deemed as not related. Similarly, a rule based on the size difference between two elements may correspond to an inclusion or exclusion rule.

A pre-defined threshold may specify limits on the difference between attributes to determine whether a contextual relationship exists. The difference may be reflected in the difference between character form, orientation, location, etc. between two elements. For example, one element may correspond to text in 10 point font size, whereas another element may correspond to text in a 9 point font size. In a first case, the pre-defined threshold may specify that a contextual relationship may exist if each element font size is within 1 point of the other. In a second case, the pre-defined threshold may specify that a contextual relationship does not exist unless the elements are with a 0.5 font size difference. In the first case, the first element may be contextually related to the second element, whereas in the second case, the two elements are not related. The pre-defined threshold may also relate to a difference in location, font style, size, etc. Further, the pre-defined threshold may vary according to the type of relationship and the type of elements that are to be related. For example, a pre-defined threshold for identifying a table may reflect that elements in the table must be next to each other (i.e., the distance between two elements is 0 or minimal). Whereas a pre-defined threshold to infer an identifier for a non-qualified identifier may reflect a specific distance (greater than the distance for the table) that a fully qualified identifier must be to the non-qualified identifier.

Further, in one or more embodiments of the invention, rules have classifications. The classification of the rules may be based upon the types of elements. For example, one classification may be used to determine whether elements of selection box type are related. In particular, rules that have the classification may be used to identify the contextual relationships between selection boxes. In another example, another classification may be based upon whether an element of text type is related to an element of the field type.

Continuing with FIG. 1, the form framework (102) is coupled to a presentation tool (104). A presentation tool (104) includes functionality to access the representation (103) of the form (100) and present the content in the form based on the representation (103). The presentation of the content in the form corresponds to a transformation of the form (100) or content derived from the form. The presentation may or may not include the elements or subset thereof.

For example, the presentation may be a reformatted form, a description of the differences between the form and a historical version of the form, an information sheet, and/or an application to assist a user to submit information into the form. A reformatted form corresponds to a visual display of the connected content in a different visual style from the original form (e.g., elements are displayed in a different order, different types of selection boxes are used, etc.). The differences between the historical version of the form and the current version of the form may be emphasized on the original form, listed separately, etc. An information sheet about the form may correspond to a help document that assists the user as to how to submit data into the form. Alternatively, the presentation may correspond to a graphical view of the form, which shows each element as a node and each contextual relationship as a line between the elements.

While FIG. 1 shows a schematic diagram of a possible system for content extraction from forms in accordance with one or more embodiments of the invention, alternative systems may also be used. For example, rather than a rule based approach to content extraction, other techniques found in Artificial Intelligence theories, which those with skill in the art would appreciate, may also be used.

Figure 2:
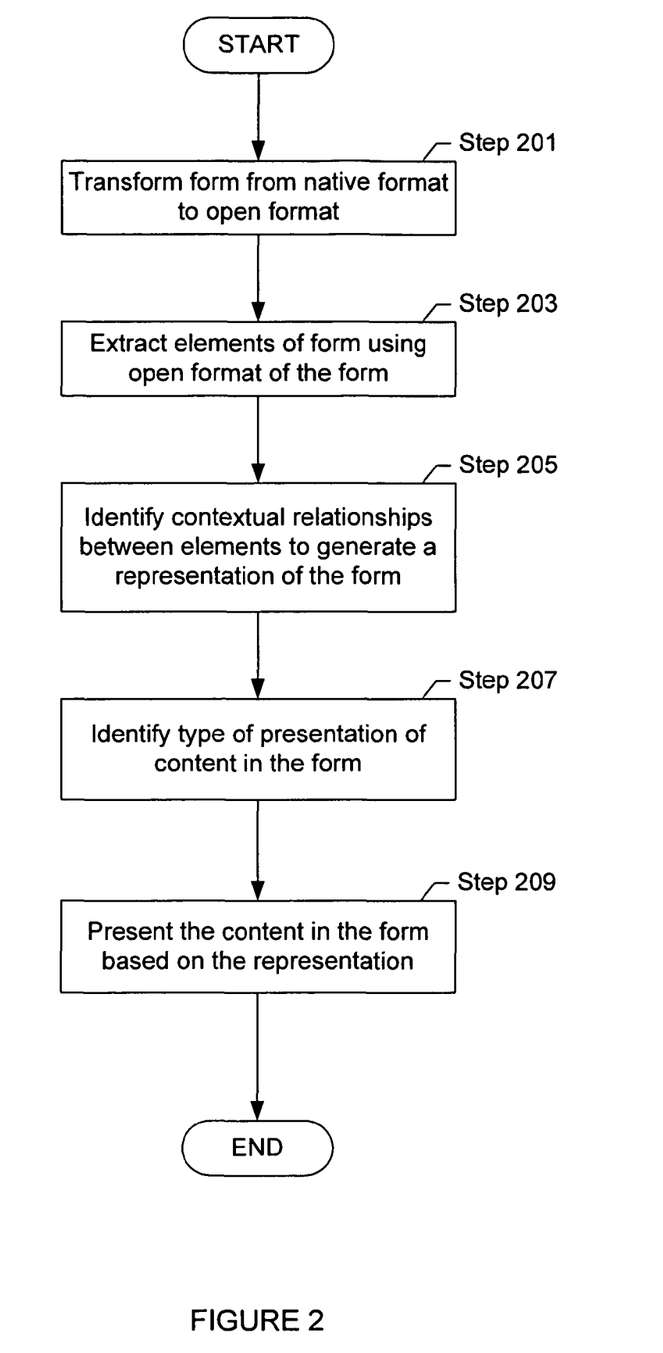
FIGS. 2-3 show a flowchart of a method for content extraction from a form in accordance with one or more embodiments of the invention.
Figure 3:
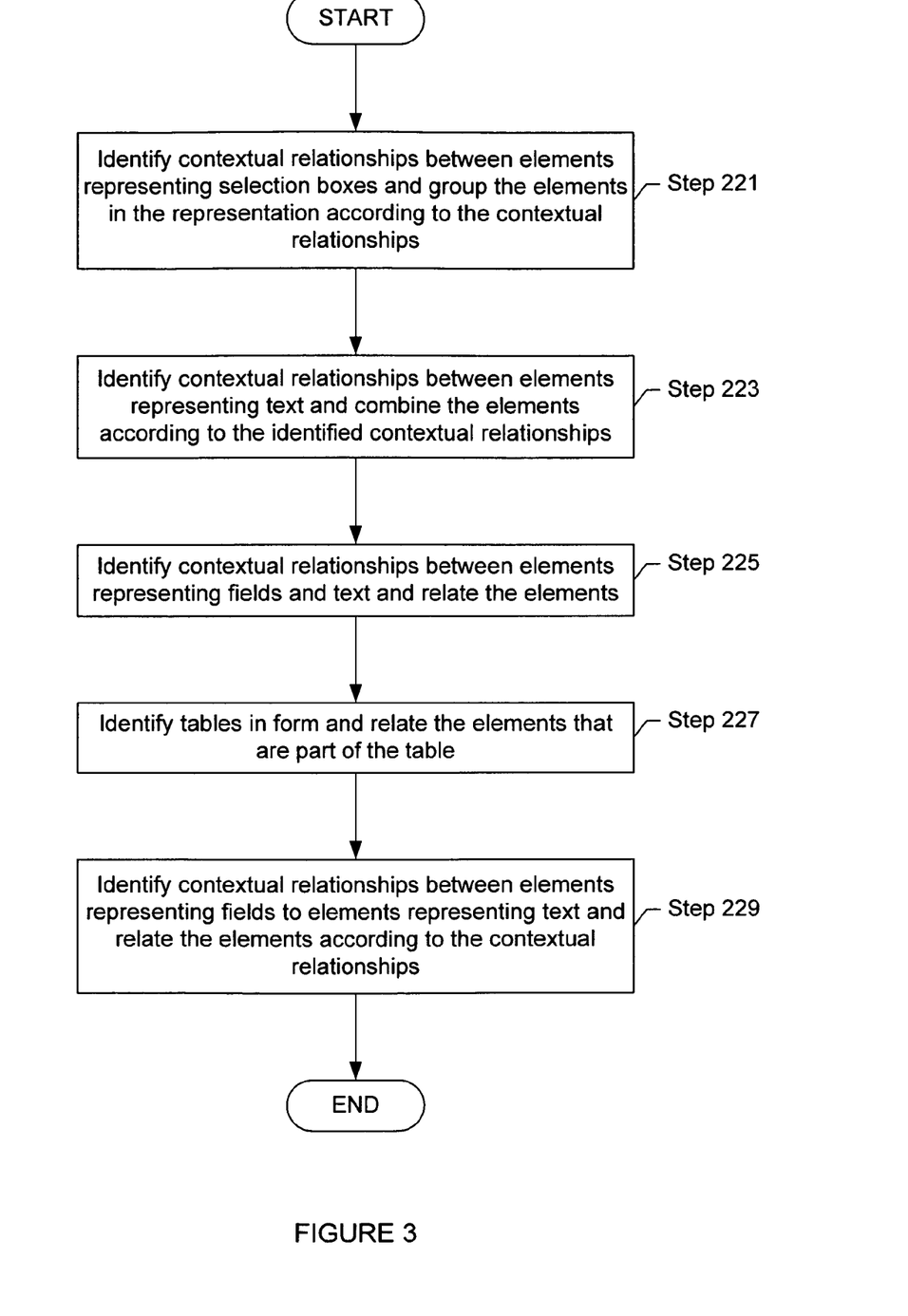

FIGS. 2-3 show a flowchart of a method for content extraction from a form in accordance with one or more embodiments of the invention. Initially, the form is transformed from the native format to an open format (Step 201). Transforming the form may involve scanning the form to transform the form from a paper based to computer readable format. If the computer readable format corresponds to an image document, then transforming the image file into a textual based document in which the letters/words in the textual based document are identifiable may be performed by a computer. Transforming an image document to a textual based document may be performed using a variety of techniques known in the art, such as using Optical Character Recognition (OCR) technology.

The open format of the form may be obtained using the textual based document. Transforming the open format may involve recognizing the types of editable fields, identifying the position of the text on the form, obtaining the open format from the application that generated the native format, reading the file that describes the open format, etc. Alternatively, a third party software product may be used that creates the open format of the form from the native format.

Next, elements of the form are extracted using the open format of the form (Step 203). Specifically, each element of the form is identified and extracted. Extracting the elements of the form may involve identifying the beginning and ending of the description of the element or creating a new memory structure (e.g., an object, a copy of the element stored separately, etc.) that is based on the element. Identifying the elements may include parsing the open format of the form.

Alternatively, rather than transforming the form from the native format to the open format and extracting the elements from the open format, the elements may be directly extracted from the form. In particular, the form may be scanned and each element directly extracted.

Next, the contextual relationships between the elements of the form are identified to generate a representation of the form (Step 205). Specifically, for subset of elements, the rules that are relevant to relating the subset of elements may be identified. If the subset of elements complies with the rules, then the subset is determined as interrelated. References may be added to each element in the subset to other elements in the subset to indicate the contextual relationships. Identifying the contextual relationships between elements is described below and in FIG. 3.

Continuing with FIG. 2, the type of presentation of the content in the form is identified (Step 207). For example, the user may select the type of presentation that the user views. Alternatively, the availability of the presentation tool to create the presentation may be used to determine the type of presentation. Further, requirements for the presentation or a default value for the type of presentation may be used to identify the type of presentation.

Once the type of presentation is identified, then the content in the form is presented based on the representation (Step 209). Presenting the content may be performed during or after the representation of the form is created. Presenting the content may involve generating a presentation of the content in the form. Specifically, generating a presentation of the content may involve updating a previous presentation, creating a new presentation, and/or overlaying a presentation of content on the original form. As previously discussed, multiple types of presentations of content may be generated. Below is a description of different methods for generating a presentation of content based upon a few of the types of presentation of the content.

If the presentation of the content corresponds to showing the difference between a current version of the form and a historical version of the form, then the historical version of the form may also be analyzed to identify the contextual relationships between elements of the historical version and create a representation of the historical version of the form. A computer may compare the representation of the historical version and the representation of the current version to identify the differences between the forms. Because representations of the versions of the form are used, the identified differences may be more accurate.

For example, if only a new line is added to the current version of the form, the representation of the current version of the form may include the element or group of interrelated elements, that describe the new line. Thus, the difference between the representations may show that only the new line was added.

Furthermore, a computer may present the differences between the current version of the form and the historical version of the form that are otherwise not evident to an individual viewing one form alone. For example, a field in the current version allows for entry of an extra digit as described in the element corresponding to the field whereas a historical version did not have the extra digit as described in the corresponding element of the previous version. In the example, the attributes of the two elements may be compared to identify the difference of the extra digit.

Thus, the identified differences may include differences that are visually apparent (e.g., changes in text, addition of lines, etc.) and/or not visually apparent (e.g., changes in the number of allowed characters for user input, changes in which line are referenced in a line, etc.) to an individual reviewing the form.

Several methods exist for displaying the identified difference. For example, the identified difference may be emphasized on the form, such as using highlighting, changing the color, changing the font, adding a comment or bubble with the identified difference, etc. A computer may, for example, create a listing of the identified differences. The listing may or may not reference the original form.

Further, the identified differences may be used to change user manuals that assist the user to enter data into the form, adjust an application that assists a user, or perform any other function in which identifying the difference between a historical version of the form and a current version of the form is useful.

Another type of presentation is a reformatted form in accordance with one or more embodiments of the invention. A reformatted form may change the order of the content of the form to be more visually intuitive to the user. For example, text and fields that are calculated from and therefore dependent upon a preceding field may be relocated so as to be near the preceding field.

A reformatted form may also change the type and attributes of the editable fields. For example, an editable field that previously corresponded to a collection of radio buttons or mutually exclusive check boxes may be changed to a drop-down menu. In another example, if the text describing the field requires a numeric input, then the field may be modified so that only numeric input is accepted.

Thus, a reformatted form may not only have the form in a different file type format that requires a different application to view the form, but may also change the appearance of the form that is displayed.

In addition to a reformatted form, the presentation may also correspond to an information sheet about the form. The information sheet may correspond to a list of instructions to a user on how to enter data into the form. For example, the information sheet may specify the number of characters required for a field or detail which editable field corresponds to which text. The information sheet may also correspond to a help file that explains the form.

Further, the presentation of the form may correspond to an application to assist users to enter data into the form. Specifically, an application may be generated that guides a user through entering content in the form. By first identifying the contextual relationships between the form and editable fields, when the user submits information for an editable field, the application can identify the editable field on the form for which the information belongs.

For example, the form may correspond to a request for administrative information. The form, in the example, includes text stating "First Name" and a field nearby as well as other text and editable fields. A contextual relationship is identified between the text and the field. An application is designed that asks a user a series of questions and based on the answer enters the data in the form. Accordingly, in the example, the application has a dialog box that has only "Please enter your first name in the line below" and space for a user to enter their name. The user enters the name into the space. The application then obtains the name that the user enters from the space, accesses the identified contextual relationship to determine that the corresponding field is the one near the "First Name" text.

As shown above, many different types of presentations of the content of the form exist. The presentations described above are only a few of the many different types.

FIG. 3 shows a flow diagram of a method to identify contextual relationships between elements in accordance with one or more embodiments of the invention. The steps described in FIG. 3 may be performed in any order and may be modified based upon rules for identifying relationships.

Initially, contextual relationships between elements representing selection boxes are identified and grouped in the representation according to the contextual relationships (Step 221). At this stage, the option text for the selection box, the selection box identifiers and the selection box are interrelated in accordance with one or more embodiments of the invention. Identifying contextual relationships between elements representing selection boxes may be performed by identifying rules that are classified for selection boxes.

For example, one rule may associate elements representing identifiers with the selection boxes based on the distance and the location of the selection box with respect to the identifier. Similarly, based upon the location of option text, the location of the identifier and/or the location of the selection box, a determination may be made whether the option text is interrelated with the identifier and/or the selection box.

Once the contextual relationships are established between the selection box, the option text, and the identifier, the identifier may be used to determine whether selection boxes are related. For example, if the order of elements displayed on a line of the form are as follows: "a", selection box, "option 1", "b", selection box, "option 2", then the "a", selection box, "option 1" may be interrelated and "b", selection box, "option 2" may be interrelated. Then, in the example, because "b" alphabetically is directly after "a", a contextual relationship may be identified between the interrelationship of "a", selection box, "option 1" and the interrelationship of "b", selection box, "option 2". As shown in the example, contextual relationships may be hierarchical whereby the closer the contextual relationship, the closer the elements are in the hierarchy.

Further, after identifying a contextual relationship, between elements representing selection boxes, the elements are grouped in the representation. Grouping the elements may involve, for example, creating a new definition of a selection box set and moving each selection box in the identified contextual relationship as a sub-definition of the selection box set. Alternatively, references, pointers, data structures, and other such techniques may be used to show a relationship between elements that are in a contextual relationship. Further, Step 221 may be repeated until all contextual relationships between elements representing selection boxes are identified and grouped.

Continuing with FIG. 3, contextual relationships between elements representing text are identified and combined according to the contextual relationship in accordance with one or more embodiments of the invention (Step 223). At this stage, elements that represent text and should be grouped are related by combining the elements or creating another such relationship in the representation in accordance with one or more embodiments of the invention. Further, identifiers are identified and inferred if not fully qualified.

Determining whether text should be represented as a group may be performed by identifying the location of elements representing text on a form and determining whether the text represented by the elements are complete. For example, if a first element represents the phrase, "If you did not", a second element represents the phrase "get a W-2," and a third element represents the phrase "See page 19." and the elements are stacked within empty space surrounding the three elements, then the elements may be determined as belonging to the same text. Accordingly, the three elements may be combined to generate a new element that represents the text from all three elements with line break indicators between the texts of each of the elements.

Identifying identifiers and determining whether identifiers are fully qualified may be performed by determining whether text complies with a regular expression corresponding to identifiers. For example, a regular expression to identify a fully qualified identifier may specify that the general form of an identifier is a number, followed by an optional letter (if necessary) followed by a period. An element that includes a number and a period or a number, letter, and period is determined to be a fully qualified identifier. A single letter and period may be determined as an non-qualified identifier. Accordingly, a preceding identifier (preceding based on location) may be searched to determine whether any letter of the preceding identifier directly precedes the letter of the current identifier. If the current identifier is unqualified and the letter of a preceding identifier directly precedes the letter of the current identifier, then the numeric portion of the preceding identifier may be prepended to the current identifier. For example, if the current identifier is "b." and the preceding identifier is "9a.", then the element representing the current identifier may be modified to show that the current identifier is "9b."

Further, elements representing identifiers may be related to elements representing text. Specifically, when fully qualified identifiers are identified, then the elements that represent the text corresponding to the identifiers are identified. Identifying the relationship between the identifier and the text may be performed using the location and font of the identifier and text. For example, an identifier that is directly neighboring text may be determined as contextually related to the text. A relationship may be established between the element representing the identifier and the element representing the text in accordance with one or more embodiments of the invention. Alternatively, the identifier may be added as an attribute of the element representing the text and the element representing the identifier may be removed. Specifically, the element may be moved from a top level definition in the open format to a lower level definition in the open format in which the element may be nested under another element, such as within a definition of the text.

Continuing with FIG. 3, contextual relationships between elements representing fields are identified and related (Step 225). Identifying contextual relationships between elements representing fields may be performed by accessing rules that are classified for fields. For example, one rule may specify that neighboring fields are related. Using the rule, if three fields are next to each other (e.g., a social security number), then the three fields may be determined to be related. Further, elements that represent identifiers may be related to elements representing fields in a manner similar to identifying relationships between identifiers and text. Specifically, the representation may be updated to reflect each identified contextual relationship between the elements representing fields. For example, a conglomerate field definition may be used that has sub-definitions corresponding to the elements representing the fields that are contextually interrelated.

Further, tables in the form are identified and the elements that are part of each table are related in accordance with one or more embodiments of the invention (Step 227). Identifying tables may begin by searching through the elements to identify patterns that might correspond to columns of a table. Elements belonging to columns of a table are next to each other horizontally and on top of each other vertically in accordance with one or more embodiments of the invention. Accordingly, the elements that might form a column are grouped in accordance with one or more embodiments of the invention. Specifically, the location of the elements on the form may be used to determine whether the element is part of a column. Using the columns, one or more tables are created based upon the vertical and horizontal location of the column within the form in accordance with one or more embodiments of the invention. A computer may identify a table for both elements of types editable fields and element of type text.

Once a table is identified, the elements that form the table are related in the representation. For example, attributes may be added to each element to reflect the table to which the element belongs and the position (row, column) of the element within the table. In one or more embodiments of the invention, a table definition may be created in the representation. The table definition may include sub-definitions of each element that is part of the table. Alternatively, pointer, references, and other such techniques may be used to relate the elements in the representation that are determined to be part of the same table. Further, the procedure described for Step 227 may repeat until all tables are identified and an indication of the table is stored in the representation.

In addition, contextual relationships between elements representing field and elements representing text are identified and related according to the contextual relationships (Step 229). Identifying contextual relationships between elements representing field and elements representing text includes determining which element representing text is most closely related to which element representing a field for each field. In particular, each editable field is assumed to have text describing the editable field in accordance with one or more embodiments of the invention.

By comparing elements representing text that are near the editable field, a determination can be made whether the elements are related. Moreover, a threshold value may be used to determine whether the elements are related. The threshold value may have a separate threshold acceptable distance for the horizontal difference than the vertical difference between two elements. If text for an editable field is not found within the threshold, then the threshold may be expanded. Further, a quality value may be associated to the contextual relationship to identify accuracy level or probabilistic value that the elements should be contextually related. In one or more embodiments of the invention, the quality value may be identified as a proportion in which the threshold is expanded.

Once a contextual relationship between elements representing a field and elements representing text are identified, the elements are related according to the contextual relationship in the representation. Any of the methods discussed above may be used to show the identified contextual relationship in the representation. The process of Step 229 may repeat until all contextual relationships between elements representing fields and elements representing text are identified. Further, the same element may be determined as contextually related to multiple other elements. Thus, nesting may occur to creating a hierarchy of contextual relationships.

As discussed above, while the contextual relationships are identified, a representation of the form may be created and updated to show the contextual relationships. From the representation, a presentation of the content of the form may be generated as discussed above.

Figure 4:
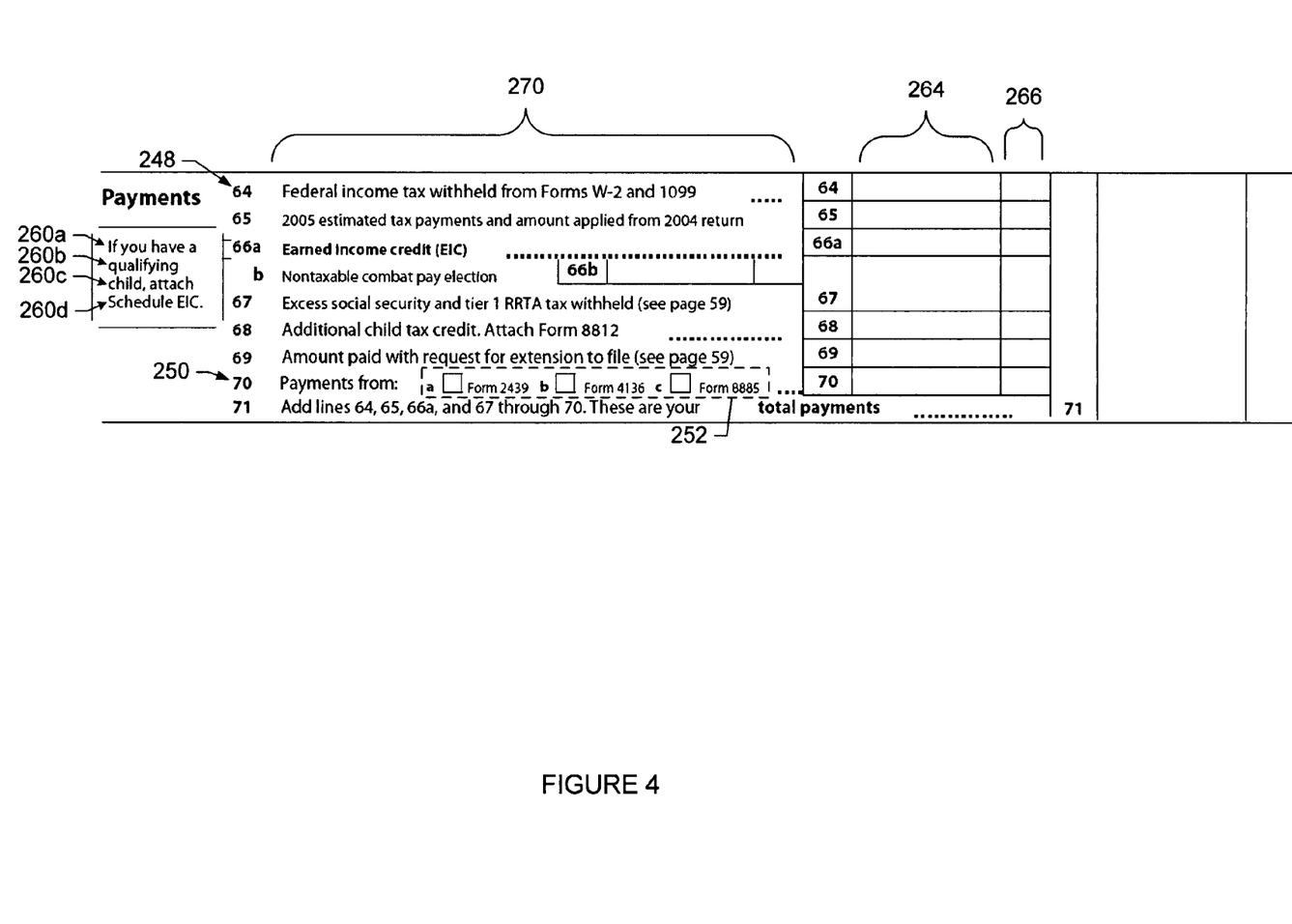
FIG. 4 shows an example form for content extraction in accordance with one or more embodiments of the invention.

FIG. 4 shows an example form for content extraction in accordance with one or more embodiments of the invention. Specifically, FIG. 4 shows an excerpt of an Internal Revenue Service 1040 Form. In the following example, the open format of the form is obtained by using Adobe® Designer and creating an XDP document that is approximately thirteen hundred lines in length. Initially, the elements are extracted from the open format of the form. Each element corresponds to a portion of a line of the form. For example, initially line 64 (248) has the following individual elements: "64", "Federal income tax withheld from the Forms W-2 and 1099", "64", a field, and a field in accordance with one or more embodiments of the invention. Similarly, in the example, Line 70 (270) has the following elements "70", "Payments From:", "a", checkbox, "Form 2439", "b", checkbox, "Form 4136", "c", checkbox, "Form 8885", " . . . ", "70", field, and a field. The elements of line 64 are initially not related in the extraction. Similarly, the elements of line 70 are initially not related in the extraction in accordance with one or more embodiments of the invention.

In a step to relate the content of line 70 (250), the group of checkboxes are identified and interrelated. Initially, the identifier, checkbox, and option text is interrelated. Specifically, "a", checkbox, "Form 2439" are interrelated, "b", checkbox, and "Form 4136" are interrelated, "c", checkbox, and "Form 8885" are interrelated. Next, incrementing identifiers (i.e., "a" near "b" near "c") are acknowledged. Because the identifies are located within the same region of the form, the checkboxes are grouped (252) in accordance with one or more embodiments of the invention. Next, a textual description of the group of checkboxes is identified. Because "Payments From:" precedes the group, "Payments From" is determined to be contextually related to the group.

Further, at this stage, the identifiers may be determined as not fully qualified. Specifically, the identifiers do not comply with the regular expression of a number preceding a letter followed by a period. Because the identifiers are determined as not fully qualified, the fully qualified identifiers may be inferred. One method to infer the fully qualified identifier is to use the preceding identifier that is the identifier of the textual description of the group. The preceding identifier has a numeric value of "70." Accordingly, "70" may be prepended onto "a", "b", and "c" to create "70a", "70b", and "70c" respectively. A possible representation of the checkbox group is as shown below:

<text value="Payments From:">
<checkBoxSet>
<checkbox id="70a" value="Form 2439"/>
  <checkbox id="70b" value="Form 4136"/>
  <checkbox id="70c" value="Form 8885"/>
</checkBoxSet>
</text>

In another step, the text of the paragraph, "If you have a qualifying child, attach Schedule EIC.", is interrelated. Specifically, the paragraph is initially divided into four elements: "If you have a" (260a), "qualifying" (260b), "child, attach" (260c), and "Schedule EIC." (260d). Because each element is in the same geospatial region with the same font type, the elements are determined to be contextually related. Accordingly, the elements may be merged together, thereby reducing four elements into a single element. A possible representation of the element representing the paragraph is as shown below:

<text value="If you have a {NEWLINE} qualifying {NEWLINE} child, attach {NEWLINE} Schedule EIC."/>

Additionally, contextual relationships between fields are identified. Specifically, two fields (264, 266) exist for each of the lines 64 to 71. The elements describing the fields have attributes of requiring a numeric value between zero and three digits. Fields (264, 266) that are direct neighbors on the same line with an identifier preceding the fields are determined to be contextually related in accordance with one or more embodiments of the invention. Specifically, fields are interrelated because the fields are within a threshold distance on the same line and have boundaries of a combination of horizontal and vertical lines in accordance with one or more embodiments of the invention. Each line may have the following possible representation:

```
<textField format="0-3">
```

Next, using an assumption that each field has text describing the field, identification of the descriptive text is determined. Specifically, contextual relationships are identified between elements corresponding to one or more fields and elements corresponding to text. Each element describing the text for line items 64-71 are vertically in line with the corresponding fields. Further, the elements have the same identifier as the corresponding field. Thus, a contextual relationship is identified between text and fields in the same line with the same identifier. A possible representation of the contextual relationship is as shown below:

```
<text value="Federal Income tax withheld from Forms
    W-2 1099" identifier="64">
    <textField format="0-3" identifier="64">
</text>
```

As shown in the example, from the Payments section of the Internal Revenue Service 1040 form, Checkboxes, check box sets, text fields, text, identifiers, lines, etc. may be identified and interrelated.

Figure 5:
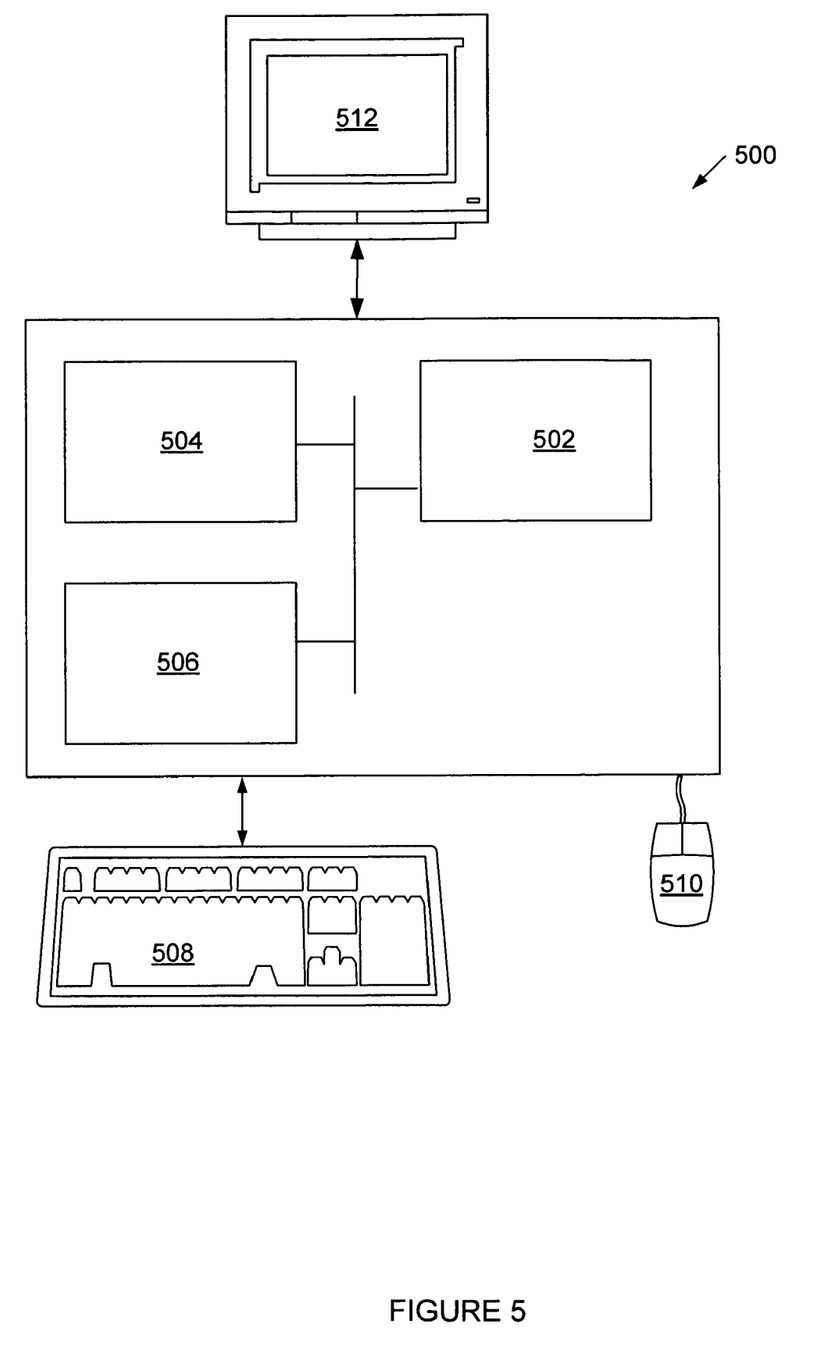
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., object extractor, content engine, rules, presentation tool, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for presenting content in a form comprising:
    extracting, from an open format for rendering the form, a plurality of elements from a single instance of the form to obtain a plurality of extracted elements, wherein the plurality of elements is the content of the form;
    identifying a plurality of contextual relationships between the plurality of extracted elements, wherein identifying the plurality of contextual relationships comprises:
        identifying a first visual attribute of a first extracted element of the plurality of extracted elements,
        identifying a second visual attribute of a second extracted element of the plurality of extracted elements, and
        relating the first extracted element with the second extracted element when a difference between the first visual attribute and the second visual attribute is within a predefined threshold to obtain a contextual relationship of the plurality of contextual relationships;
    generating a representation of the form, wherein the representation specifies the plurality of contextual relationships; and
    presenting the content in the form based on the representation.

2. The method of claim 1, wherein each extracted element in the plurality of extracted elements represents at least one selected from a group consisting of a text block, a selection block, and a field.

3. The method of claim 1, wherein the plurality of extracted elements comply with an object-oriented language.

4. The method of claim 1, wherein identifying the plurality of contextual relationships comprises creating a reference between interrelated elements.

5. The method of claim 1, wherein the first visual attribute is at least one selected from a group consisting of a first value of the first extracted element, a first location of the first extracted element on the single instance of the form, a first font type, a first size, a first number of characters, and a first type of user interface component.

6. The method of claim 5, wherein the second visual attribute is at least one selected from the group consisting of a second value of the second extracted element, a second location of the second extracted element on the single instance of the form, a second font type, a second size, a second number of characters, and a second type of user interface component.

7. The method of claim 1, wherein the first extracted element is a text block and the second extracted element is a field.

8. The method of claim 1, wherein the first element is a first selection block and the second element is a second selection block.

9. The method of claim 1, wherein identifying the plurality of contextual relationships comprises identifying a subset of the plurality of extracted elements that defines a table in the form.

10. The method of claim 1, wherein identifying the plurality of contextual relationships comprises relating a subset of the plurality of extracted elements to resolve identifiers.

11. The method of claim 1, wherein the representation is an XML document wherein the XML document has at least one conglomerate element, and wherein the conglomerate element comprises the first extracted element and the second extracted element when the difference between the first visual attribute and the second visual attribute is within a predefined threshold.

12. The method of claim 1, wherein presenting the content comprises generating a presentation, wherein the presentation shows differences between the form and a historical form.

13. The method of claim 12, wherein the differences are emphasized on the form.

14. The method of claim 12, wherein only the differences are listed in the presentation.

15. The method of claim 1, wherein presenting the content comprises generating a presentation, wherein the presentation comprises a reformatted form, wherein the reformatted form has a different ordering of the plurality of extracted elements than the form.

16. The method of claim 1, wherein presenting the content comprises generating a presentation, wherein the presentation comprises an information sheet about the form.

17. The method of claim 1, wherein presenting the content comprises generating a presentation, wherein the presentation is an application to guide a user through entering data into the form.

18. A system for presenting content in a form comprising:
a computer processor;
an element extractor executing on the computer processor and configured to:
  extract, from an open format for rendering the form, a plurality of elements from a single instance of the form to obtain a plurality of extracted elements, wherein the plurality of elements is the content of the form;
a content engine executing on the computer processor, operatively connected to the element extractor, and configured to:
  access the plurality of extracted elements;
  identify a plurality of contextual relationships between the plurality of extracted elements, wherein identifying the plurality of contextual relationships comprises:
    identifying a first visual attribute of a first extracted element of the plurality of extracted elements,
    identifying a second visual attribute of a second extracted element of the plurality of extracted elements, and
    relating the first extracted element with the second extracted element when a difference between the first visual attribute and the second visual attribute is within a predefined threshold to obtain a contextual relationship of the plurality of contextual relationships; and
  generate a representation of the form, wherein the representation specifies the plurality of contextual relationships; and
a presentation tool operatively connected to the content engine, and configured to:
  access the representation; and
  present the content using the representation.

19. The system of claim 18, wherein each extracted element in the plurality of extracted elements represents at least one selected from a group consisting of a text block, a selection block, and a field.

20. The system of claim 18, wherein the element extractor extracts the plurality of extracted elements as object oriented language objects.

21. The system of claim 18, wherein identifying the plurality of contextual relationships comprises creating a reference between interrelated objects.

22. The system of claim 18, wherein the first visual attribute is at least one selected from a group consisting of a first value of the first extracted element, a first location of the first extracted element on the single instance of the form, a first font type, a first size, a first number of characters, and a first type of user interface component.

23. The system of claim 22, wherein the second visual attribute is at least one selected from the group consisting of a second value of the second extracted element, a second location of the second extracted element on the single instance of the form, a second font type, a second size, a second number of characters, and a second type of user interface component.

24. The system of claim 18, wherein the first extracted element is a text block and the second extracted element is a field.

25. The system of claim 18, wherein the first extracted element is a first selection block and the second extracted element is a second selection block.

26. The system of claim 18, wherein identifying the plurality of contextual relationships comprises identifying a subset of the plurality of extracted elements that defines a table in the form.

27. The system of claim 18, wherein identifying the plurality of contextual relationships comprises relating a subset of the plurality of extracted elements to resolve identifiers.

28. The system of claim 18, wherein the representation is an XML document wherein the XML document has at least one conglomerate element, and wherein the conglomerate element comprises the first extracted element and the second extracted element when the difference between the first visual attribute and the second visual attribute is within a predefined threshold.

29. The system of claim 18, wherein presenting the content comprises generating a presentation, wherein the presentation shows differences between the form and a historical form.

30. The system of claim 29, wherein the differences are emphasized on the form.

31. The system of claim 29, wherein only the differences are listed in the presentation.

32. The system of claim 18, wherein presenting the content comprises generating a presentation, wherein the presentation comprises a reformatted form, wherein the reformatted form has a different ordering of the plurality of extracted elements than the form.

33. The system of claim 18, wherein presenting the content comprises generating a presentation, wherein the presentation comprises an information sheet about the form.

34. The system of claim 18, wherein presenting the content comprises generating a presentation, wherein the presentation is an application to guide a user through entering data into the form.

35. A computer readable medium for presenting content in a form, the computer readable medium comprising computer readable program code stored therein for causing a computer system to:
  extract, from an open format for rendering the form, a plurality of elements from a single instance of the form to obtain a plurality of extracted elements, wherein the plurality of elements is the content of the form;
  identify a plurality of contextual relationships between the plurality of extracted elements, wherein identifying the plurality of contextual relationships comprises:
    identifying a first visual attribute of a first extracted element of the plurality of extracted elements;
    identifying a second visual attribute of a second extracted element of the plurality of extracted elements; and
    relating the first extracted element with the second extracted element when a difference between the first visual attribute and the second visual attribute is within a predefined threshold to obtain a contextual relationship of the plurality of contextual relationships;

generate a representation of the form, wherein the representation specifies the plurality of contextual relationships; and present the content in the form based on the representation.

36. The computer readable medium of claim 35, wherein the plurality of extracted elements comply with an object-oriented language.

37. The computer readable medium of claim 35, wherein the first visual attribute is at least one selected from a group consisting of a first value of the first extracted element, a first location of the first extracted element on the single instance of the form, a first font type, a first size, a first number of characters, and a first type of user interface component.

38. The computer readable medium of claim 37, wherein the second visual attribute is at least one selected from the group consisting of a second value of the second extracted element, a second location of the second extracted element on the single instance of the form, a second font type, a second size, a second number of characters, and a second type of user interface component.

39. The computer readable medium of claim 35, wherein the first extracted element is a text block and the second extracted element is a field.

40. The computer readable medium of claim 35, wherein the first extracted element is a first selection block and the second extracted element is a second selection block.

41. The computer readable medium of claim 35, wherein identifying the plurality of contextual relationships comprises identifying a subset of the plurality of extracted elements that defines a table in the form.

42. The computer readable medium of claim 35, wherein identifying the plurality of contextual relationships comprises relating a subset of the plurality of extracted elements to resolve identifiers.

43. The computer readable medium of claim 35, wherein the representation is an XML document wherein the XML document has at least one conglomerate element, and wherein the conglomerate element comprises the first extracted element and the second extracted element when the difference between the first visual attribute and the second visual attribute is within a predefined threshold.

44. The computer readable medium of claim 35, wherein presenting the content comprises generating a presentation, wherein the presentation shows differences between the form and a historical form.

45. The computer readable medium of claim 44, wherein the differences are emphasized on the form.

46. The computer readable medium of claim 44, wherein only the differences are listed in the presentation.

47. The computer readable medium of claim 35, wherein presenting the content comprises generating a presentation, wherein the presentation comprises a reformatted form, wherein the reformatted form has a different ordering of the plurality of extracted elements than the form.

48. The computer readable medium of claim 35, wherein presenting the content comprises generating a presentation, wherein the presentation comprises an information sheet about the form.

49. The computer readable medium of claim 35, wherein presenting the content comprises generating a presentation, wherein the presentation is an application to guide a user through entering data into the form.

* * * * *